US011836731B2

(12) United States Patent
Johnson et al.

(10) Patent No.: US 11,836,731 B2
(45) Date of Patent: Dec. 5, 2023

(54) DYNAMICALLY-TUNABLE INTERVENTIONS FOR USER TRANSACTIONS

(71) Applicant: Toshiba Global Commerce Solutions Holdings Corporation, Tokyo (JP)

(72) Inventors: Brad M. Johnson, Raleigh, NC (US); Adrian Rodriguez, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 175 days.

(21) Appl. No.: 17/203,627

(22) Filed: Mar. 16, 2021

(65) Prior Publication Data

US 2022/0300969 A1 Sep. 22, 2022

(51) Int. Cl.
*G06Q 20/40* (2012.01)
*H04W 4/02* (2018.01)
*G06Q 20/32* (2012.01)
*G06V 40/10* (2022.01)

(52) U.S. Cl.
CPC ....... *G06Q 20/405* (2013.01); *G06Q 20/3224* (2013.01); *G06Q 20/401* (2013.01); *G06V 40/103* (2022.01); *H04W 4/027* (2013.01)

(58) Field of Classification Search
CPC ..... G06Q 10/063114; G06Q 10/06312; G06K 9/00302; G06K 9/00771; G07C 2011/04; G07G 1/0036
See application file for complete search history.

(56) References Cited

U.S. PATENT DOCUMENTS

| 9,172,809 | B1* | 10/2015 | Mockus | H04M 3/5235 |
| 9,892,371 | B1* | 2/2018 | Cronin | G06Q 30/0261 |
| 10,478,126 | B2* | 11/2019 | Najafi | A61B 5/0816 |
| 11,030,649 | B1* | 6/2021 | Barakat | G06Q 30/0201 |
| 11,163,846 | B1* | 11/2021 | Kadayam | G06Q 30/016 |
| 2003/0102956 | A1* | 6/2003 | McManus | G07C 11/00 |
| | | | | 340/5.2 |
| 2005/0259797 | A1* | 11/2005 | Swartz | G06K 7/10881 |
| | | | | 379/93.12 |
| 2008/0249856 | A1* | 10/2008 | Angell | G06Q 30/0271 |
| | | | | 705/14.67 |
| 2012/0116789 | A1* | 5/2012 | Boss | G06Q 10/06 |
| | | | | 705/500 |

(Continued)

OTHER PUBLICATIONS

Disclosed Anonymously, "System and Method for Adaptive Queue Management for retail environment." An IP.com Prior Art Database Technical Disclosure, IP.com No. IPCOM000224132D IP.com Electronic Publication Date: Dec. 11, 2012, https://ip.com/IPCOM/000224132 (Year: 2012).*

(Continued)

*Primary Examiner* — Daniel S Felten
*Assistant Examiner* — Claire A Rutiser
(74) *Attorney, Agent, or Firm* — Patterson + Sheridan, LLP

(57) ABSTRACT

The present disclosure provides techniques to selectively provide user interventions. A transaction is initiated for a user device, and data describing a user of the user device during the transaction is collected. A preferred level of intervention for the transaction is determined based on the collected data. Interventions are selectively provided to the user device during the transaction based on the preferred level of intervention.

20 Claims, 5 Drawing Sheets

(56) References Cited

U.S. PATENT DOCUMENTS

| | | | | |
|---|---|---|---|---|
| 2013/0090881 | A1* | 4/2013 | Janardhanan | G06F 1/163 |
| | | | | 702/104 |
| 2014/0207626 | A1* | 7/2014 | Braxton | G06Q 30/0601 |
| | | | | 705/26.1 |
| 2014/0278688 | A1* | 9/2014 | Sullivan | G06Q 30/0207 |
| | | | | 705/7.22 |
| 2015/0350902 | A1* | 12/2015 | Baxley | H04W 12/12 |
| | | | | 726/7 |
| 2017/0053326 | A1* | 2/2017 | SivasankaranNair | |
| | | | | G07G 1/0081 |
| 2018/0039745 | A1* | 2/2018 | Chevalier | G16H 30/20 |
| 2018/0197218 | A1* | 7/2018 | Mallesan | G06K 9/00771 |
| 2018/0336009 | A1* | 11/2018 | Yoganandan | G06F 3/0346 |
| 2019/0058740 | A1* | 2/2019 | Singman | H04L 65/1069 |
| 2020/0160670 | A1* | 5/2020 | Zalewski | G06Q 20/327 |
| 2020/0327315 | A1* | 10/2020 | Mullins | G06V 20/52 |
| 2021/0097461 | A1* | 4/2021 | Baughman | G06V 20/52 |
| 2021/0155409 | A1* | 5/2021 | Haid | B65G 1/0492 |
| 2021/0224771 | A1* | 7/2021 | Guyot | G06Q 20/20 |
| 2021/0294557 | A1* | 9/2021 | Lam | G06F 16/9577 |
| 2021/0304169 | A1* | 9/2021 | Helms | G06Q 20/3224 |

OTHER PUBLICATIONS

Disclosed Anonymously, "Detecting Responses to Promotions in Store", An IP.com Prior Art Database Technical Disclosure IP.com No. IPCOM000247581D, Sep. 18, 2016, https://ip.com/IPCOM/000247581 (Year: 2016).*

Anonymous, "System and Method for Adaptive Queue Management for retail environment." IP.com No. IPCOM000224132D; IP.com Electronic Publication Date: Dec. 11, 2012; Downloaded from https://ip.com/IPCOM/000224132. (Year: 2012).*

* cited by examiner

DYNAMICALLY-TUNABLE INTERVENTIONS FOR USER TRANSACTIONS

BACKGROUND

The present disclosure relates to user-controlled transactions, and more specifically, to dynamically tuning interventions in order to control user-directed transactions.

Self-Service retail environments (e.g., self-checkouts) have become increasingly common in a wide variety of establishments. Typically, these systems are designed to be largely autonomous, needing minimal oversight from employees. Additionally, there has been increasing effort to further reduce friction in retail environments, such as by automatically identifying items selected by the customer (e.g., placed in a cart or basket) and allowing the customer to check out automatically without stopping at a designated check out area. For example, the system may use cameras or other sensors to identify objects being selected, and the user may automatically be charged accordingly when they leave the premises.

However, such systems can often lead to reduced security control, as well as reduced capacity to manage load on the system and to direct and control the flow of users and transactions. Sacrificing such control can reduce the efficacy and efficiency of the overall system.

SUMMARY

According to one embodiment of the present disclosure, a method is provided. The method includes initiating a transaction for a user device; collecting data describing a user of the user device during the transaction; determining, based on the collected data, a preferred level of intervention for the transaction; and selectively providing interventions to the user device during the transaction based on the preferred level of intervention.

According to a second embodiment of the present disclosure, a computer-readable storage medium is provided. The computer-readable storage medium contains computer program code that, when executed by operation of one or more computer processors, performs an operation. The operation includes initiating a transaction for a user device; collecting data describing a user of the user device during the transaction; determining, based on the collected data, a preferred level of intervention for the transaction; and selectively providing interventions to the user device during the transaction based on the preferred level of intervention.

According to a third embodiment of the present disclosure, a system is provided. The system includes one or more computer processors, and a memory containing a program which, when executed by the one or more computer processors, performs an operation. The operation includes initiating a transaction for a user device; collecting data describing a user of the user device during the transaction; determining, based on the collected data, a preferred level of intervention for the transaction; and selectively providing interventions to the user device during the transaction based on the preferred level of intervention.

DETAILED DESCRIPTION

Figure 1:
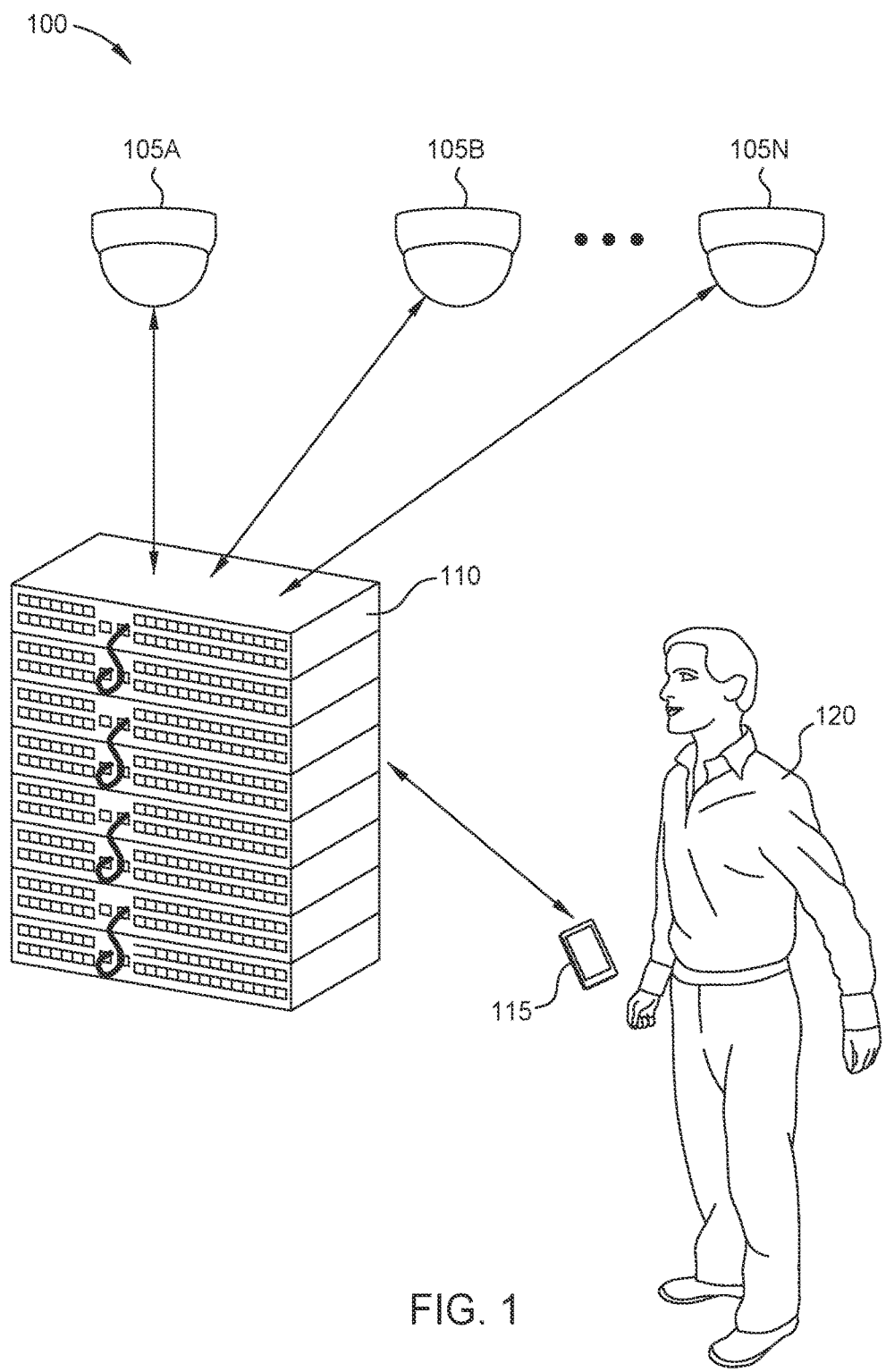
FIG. 1 illustrates an environment configured to automatically monitor transactions and dynamically generate appropriate interventions, according to one embodiment disclosed herein.

Embodiments of the present disclosure provide techniques to dynamically and automatically adjust friction by selectively generating and providing interventions or interruptions to user-directed activities. In some embodiments, users can use computing devices to scan items and complete transactions in a retail environment, and the system may analyze a variety of contextual data in order to determine which interventions should be provided via the computing device.

For example, the system may determine that a given transaction should be accelerated (e.g., because the user is acting urgently or has priority). In one embodiment, the system may therefore reduce or remove interventions (e.g., reducing menu items or options, refraining from providing promotional offers, withholding survey questions, and the like) in order to accelerate the transaction.

In some embodiments, the system may also determine that a given transaction should be slowed (e.g., because it is suspected that the user is dishonest or has made a mistake), such as to allow time for investigation. In one embodiment, the system may therefore provide additional interruptions (e.g., additional menu items or steps, additional questions, and the like) to slow the process.

In embodiments, the particular transactional context used to determine the optimal level and type of intervention may vary. In some embodiments, the system uses user-defined preferences for interventions. In one such embodiment, a user may specify desired amounts of intervention during particular times or on particular days, with respect to particular items or locations in the environment, and the like. For example, the user may specify that during lunch hours or immediately after work on weekdays, they prefer minimal interventions (e.g., because they wish to move quickly through the transaction), while they welcome intervention (e.g., promotional offers) during weekends.

In some embodiments, the system can use a set of sensors in the environment (e.g., cameras) in order to collect and analyze contextual data. In one such embodiment, the system may infer the urgency of the user based on such sensor data (e.g., based on their walking speed or other body movements) and adjust the interventions accordingly (e.g., reducing interventions when the user is in a hurry, and/or increasing them if the user is moving leisurely). In at least one embodiment, the system infers the user urgency and sets the level of intervention based on the type of receptacle the user selected (e.g., whether they selected a large cart, a small cart, a carried basket, no receptacle at all, and the like).

In various embodiments, other contextual data may include the current weather, the number of people associated with the transaction (e.g., whether the user is shopping alone or with their family), a window of time or a deadline when the transaction should be completed (e.g., for delivery or pickup orders), the current flow and number of users in the space (e.g., to accelerate some users and slow others in order to control the load at any given point and/or to reduce congestion), the availability of particular items (e.g., to encourage some users to select particular items, or do spend more time in an area selecting an item), the number items the user has already selected (e.g., whether they are picking only a few items, or completing a large transaction), the types of items selected (e.g., whether the user is selecting their ordinary items, or is picking new types of item), whether employee intervention is desired (e.g., because the user prefers to have an employee offer aid, or because the system suspects the user needs assistance or is attempting to steal), the status of the user (e.g., whether they are a preferred or fast-lane customer) and the like.

In some embodiments, the contextual data can be evaluated repeatedly (e.g., at the start of the transaction and periodically throughout until the transaction is completed) in order to revise the intervention level and respond appropriately. For example, as the number of selected items increases, the opportunities to redirect or suggest other interventions may be reduced. Similarly, as the user's energy fades during a long trip, the system may reduce the interventions to allow the user to quickly complete the transaction.

In embodiments, based on the determined optimal or preferred level of intervention or interruption (sometimes referred to as friction), the system can selectively generate and/or provide such interventions appropriately for each individual user based on the current transaction context.

Generally, adjusting the level of intervention may include adding or removing operations, processes, options, offers, and the like in order to slow or accelerate the transaction. Such interventions may include, for example, offering particular promotions, suggesting alternative items, providing additional information to help aid decisions, dispatching an employee to offer assistance, asking the user to respond to a survey, including menu options or additional screens or processes in the procedure, and the like. In order to streamline the transaction, the system may refrain from providing such interventions.

FIG. 1 illustrates an environment 100 configured to automatically monitor transactions and dynamically generate appropriate interventions, according to one embodiment disclosed herein. The environment 100 includes a set of Sensors 105A-N. In the illustrated embodiment, the Sensors 105 are cameras which capture still images and/or video data. In various embodiments, the Sensors 105 may include any number and variety of sensors, including microphones to detect audio data. In an embodiment, the Sensors 105 are positioned and configured to capture data from a physical environment (e.g., a retail space).

As illustrated, the Sensors 105 are communicatively coupled with an Intervention Component 110. Although depicted as a physical device or server, in embodiments, the Intervention Component 110 may be implemented using hardware, software, or a combination of hardware and software. In at least one embodiment, the Intervention Component 110 is implemented as a cloud-based application.

In an embodiment, the Intervention Component 110 can monitor transactions in the environment 100 based at least in part on data received from the Sensors 105. For example, the Sensors 105 may transmit sensor data collected in the environment (e.g., video, images, and/or audio captured in the space). The Intervention Component 110 can evaluate some or all of this data to monitor the ongoing transactions.

For example, in some embodiments, the Intervention Component 110 can evaluate the actions of each User 120 (e.g., walking speed, receptacle choice, items selected, and the like) in order determine the appropriate level of intervention. In some embodiments, the Intervention Component 110 may also consider other contextual data, such as the time and/or date, the preferences of the User 120, historical shopping data for the User 120, and the like.

In the illustrated embodiment, a User Device 115 can be used (e.g., by a retail customer) during a transaction. In some embodiments, the User Device 115 can be used to facilitate or complete the transaction. For example, the User 120 may use the User Device 115 to scan items, capture image(s) of items, or otherwise input Items 120 (e.g., using a number or code) that they wish to purchase. For example, the User Device 115 may be used to scan a barcode or other visual encoding of the object.

In some embodiments, when a transaction is initiated using the User Device 115 (e.g., when the user signs in or enters the environment), the Intervention Component 110 can determine a level of intervention for the User 120. In some embodiments, the Intervention Component 110 may update this level periodically or upon the occurrence of defined events during the transaction. In some embodiments, the Intervention Component 110 can provide some interventions via the User Device 115. For example, the Intervention Component 110 may provide promotional offers or additional information about items via the User Device 115.

In some embodiments, the Intervention Component 110 may provide (or refrain from providing) interventions for a variety of reasons. For example, the Intervention Component 110 may determine to accelerate the transaction based on determining that the user is in a rush or prefers minimal interruption. In contrast, the Intervention Component 110 may determine to slow the transaction based on determining that the User 120 may be stealing, or in order to control the flow of users in the space. For example, the Intervention Component 110 may selectively provide interventions (such as product offers) to cause some Users 120 to linger in particular areas, cause other Users 120 to move relatively quickly towards particular areas, and the like. This can allow the Intervention Component 110 to control the movement of individuals in the space.

In some embodiments, the Intervention Component 110 may determine to provide interventions without intending to slow the transaction. That is, the Intervention Component 110 may determine that interventions are needed or welcome (e.g., to offer discounts or other information), regardless of whether such intervention will slow the transaction. For example, the Intervention Component 110 may determine that the additional intervention is warranted and the resulting slowness is acceptable, because the user is likely to prefer the interruption (e.g., because the user is not in a hurry, or has indicated that they always want to receive discount information regardless of the time or their urgency).

In at least one embodiment, the Intervention Component 110 may define a default level of intervention, and selectively accelerate transactions by removing one or more interventions from this defined level. Similarly, the Intervention Component 110 may selectively slow transactions by adding additional interventions as needed.

Figure 2:
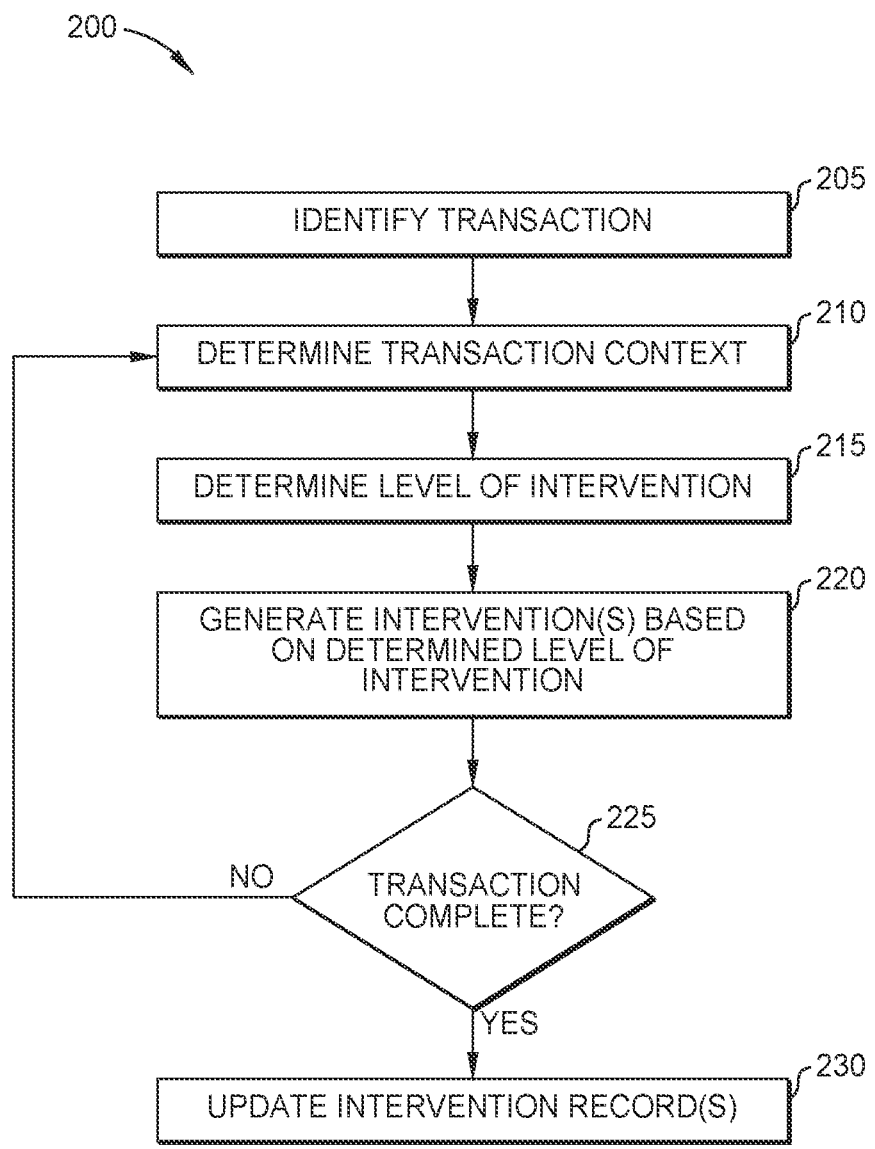
FIG. 2 is a flow diagram illustrating a method for monitoring transactions and generating optimized interventions, according to one embodiment disclosed herein.

FIG. 2 is a flow diagram illustrating a method 200 for monitoring transactions and generating optimized interventions, according to one embodiment disclosed herein. The method 200 begins at block 205, where an Intervention Component 110 identifies an ongoing transaction in an environment.

At block 210, the Intervention Component 110 determines the transaction context for the identified transaction. As discussed above, the transaction context may include a wide variety of data, including the time, date, weather, number of users associated with the transaction, inferred urgency of the user, walking speed, items selected, receptacle chosen, and the like.

The method 200 then continues to block 215, where the Intervention Component 110 determines or selects a level of intervention based on the determined context. For example, based on the time, the user's preferences, the number of items selected, and/or the chosen receptacle, the Intervention Component 110 may determine that the preferred level of intervention is low (e.g., because the user is in a rush after work and is only selecting a few items).

The method 200 then proceeds to block 220, where the Intervention Component 110 selectively generates and/or provides interventions to the user, based on the determined level of intervention. For example, if the preferred level of intervention is low, the Intervention Component 110 may refrain from providing suggestions or information about particular items. In some embodiments, employees of the environment may also be informed that the particular user should not be disturbed at the current time.

In some embodiments, in addition to a level or number of interventions, the Intervention Component 110 can also determine the preferred type of interventions based on the contextual data. For example, the user may specify that they always wish to receive discounts or promotional offers, but never desire informational interventions. Similarly, a user may indicate that they prefer in-person interruptions (e.g., offering assistance), rather than on-device interventions.

In some embodiments, the determined interventions may be targeted based on the particular item(s) the user is selecting. For example, the Intervention Component 110 may provide information nor advice relating to some items (e.g., to help a user select between a wide number of similar options), while refraining from providing such data for other items.

At block 225, the Intervention Component 110 determines whether the transaction has completed. That is, the Intervention Component 110 can determine whether the user has finished selecting items (e.g., whether the user has checked out or is preparing to check out). If the transaction has not completed, in an embodiment, the method 200 returns to block 210. In this way, the Intervention Component 110 can iteratively re-evaluate the contextual data in order to update the preferred level of intervention of time as the transaction progresses. This can allow the Intervention Component 110 to dynamically respond to changing context and circumstances.

If the Intervention Component 110 determines that the transaction as completed, the method 200 continues to block 230, where the Intervention Component 110 updates the intervention records for the transaction. In one embodiment, this includes recording an indication of the particular offers or promotions that were provided (e.g., to ensure they are not offered to the same user again, or to count the number of times it has been offered to all users).

In at least one embodiment, the Intervention Component 110 can selectively survey users regarding the provided interventions during the transaction. The responses may be stored in the intervention records. Such surveys may allow the Intervention Component 110 to dynamically respond to future contexts more accurately. For example, the user may indicate that they do not wish to fill out the survey because they are in a hurry. In response, the Intervention Component 110 may evaluate the context of the transaction (e.g., the time, date, location, the number and types of items selected, the inferred urgency of the user, and the like) and update its models to provide better targeted intervention for future transactions.

Figure 3:
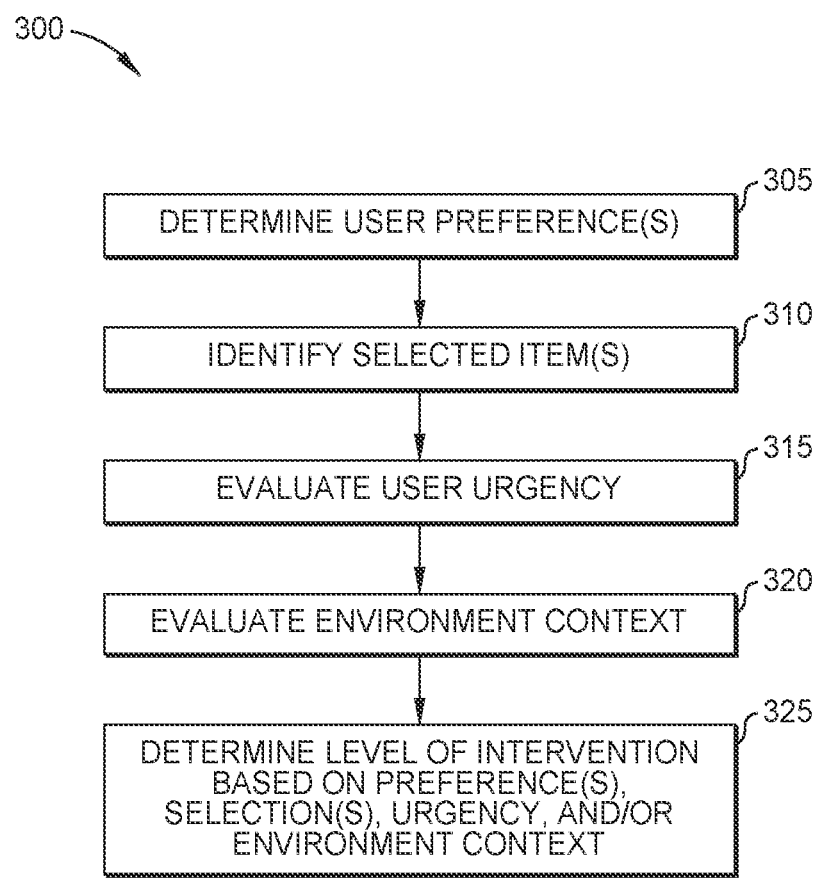
FIG. 3 is a flow diagram illustrating a method for evaluating contextual data for transactions in order to dynamically generate appropriate interventions, according to one embodiment disclosed herein.

FIG. 3 is a flow diagram illustrating a method 300 for evaluating contextual data for transactions in order to dynamically generate appropriate interventions, according to one embodiment disclosed herein. In one embodiment, the method 300 provides additional data for block 215 of FIG. 2.

The method 300 begins at block 305, where an Intervention Component 110 determines a set of user preferences for the current user. Such preferences may indicate, for example, particular days and/or times where the user prefers high or low intervention. In some embodiments, the user may also specify intervention preferences with respect to particular items or types of item (e.g., welcoming assistance when selecting wine, but declining assistance in selecting breads).

In some embodiments, some or all of the user preferences may be directly specified by the user (e.g., in response to a survey, or as part of a user profile). In at least one embodiment, some or all of the preferences may be inferred based on past behavior. For example, if the user often completes transactions at a given time (e.g., during lunch hours) and often selects the same or similar items (e.g., quickly selecting a sandwich from the deli) or often selects a relatively small number of items during these trips, the Intervention Component 110 may infer that the user will not prefer interventions during such transactions. In contrast, if the user appears to stray from this pattern (e.g., they are looking at other items or are in another section of the environment), the Intervention Component 110 may determine that intervention may be helpful to guide the user.

At block 310, the Intervention Component 110 can identify the selected item(s) of the user. In one embodiment, this includes analyzing the items that the user has already selected. For example, if the user has already selected a large number of items, the Intervention Component 110 may determine that additional interventions should be reduced.

In some embodiments, the Intervention Component 110 can consider the historical selections of the user. For example, if the user routinely selects a particular item but has selected a different brand or type of the item in this transaction, the Intervention Component 110 may determine that additional interventions should be provided during this transaction.

In at least one embodiment, the Intervention Component 110 can evaluate a predefined list (e.g., a shopping list) for the user in order to determine the preferred level of intervention. For example, if the list indicates that the user will select a generic item such as "bread," the Intervention Component 110 may determine that interventions or suggestions related to bread are welcome. In contrast, if the user has indicated a specific item (such as a particular brand or type of bread), the Intervention Component 110 may determine that such interventions are not warranted.

In some embodiments, the Intervention Component 110 may also evaluate the user process for making selections. For example, if the Intervention Component 110 determines that the user is quickly selecting an item and moving on without dwelling or looking at other options, the Intervention Component 110 may infer that intervention is not warranted at this time. In contrast, if the Intervention Component 110 determines that the user is dwelling in an area, has picked up and replaced an item (or alternative items), and the like, the Intervention Component 110 may determine that intervention is appropriate (e.g., to provide a promotion, or suggest alternatives, and the like).

At block 315, the Intervention Component 110 evaluates the user's urgency during the transaction. In some embodiments, the urgency may be user-specified (e.g., the user may indicate at the start of the transaction that they are in a hurry and prefer to be left alone). In at least one embodiment, the Intervention Component 110 can infer the user urgency based on camera data collected in the environment. For example, based on the user's walking speed and selected item receptacle, the Intervention Component 110 can determine whether the user is likely hurrying or is taking time to leisurely select items.

The method 300 continues to block 320, where the Intervention Component 110 evaluates other environmental context. For example, the Intervention Component 110 may consider the current weather, the number and distribution of users in the environment, and the like. These considerations may cause the Intervention Component 110 to selectively increase or decrease interventions for individuals users (e.g., to encourage them to dwell or move quickly to particular areas).

At block 325, the Intervention Component 110 can determine the preferred level of intervention for the user based on this and other contextual data. In embodiments, the Intervention Component 110 can thereby target specific interventions to individual users based on a variety of data in order to improve the overall experience. Further, by selectively providing interventions to some (rather than all) users, the Intervention Component 110 can target its limited resources and reduce the overall load on the system. Additionally, by selectively accelerating and decelerating transactions, the Intervention Component 110 can perform load balancing (e.g., to ensure that users complete their transactions at different times, so as to avoid overwhelming the checkout system). This can improve the functioning of the technological system.

Figure 4:
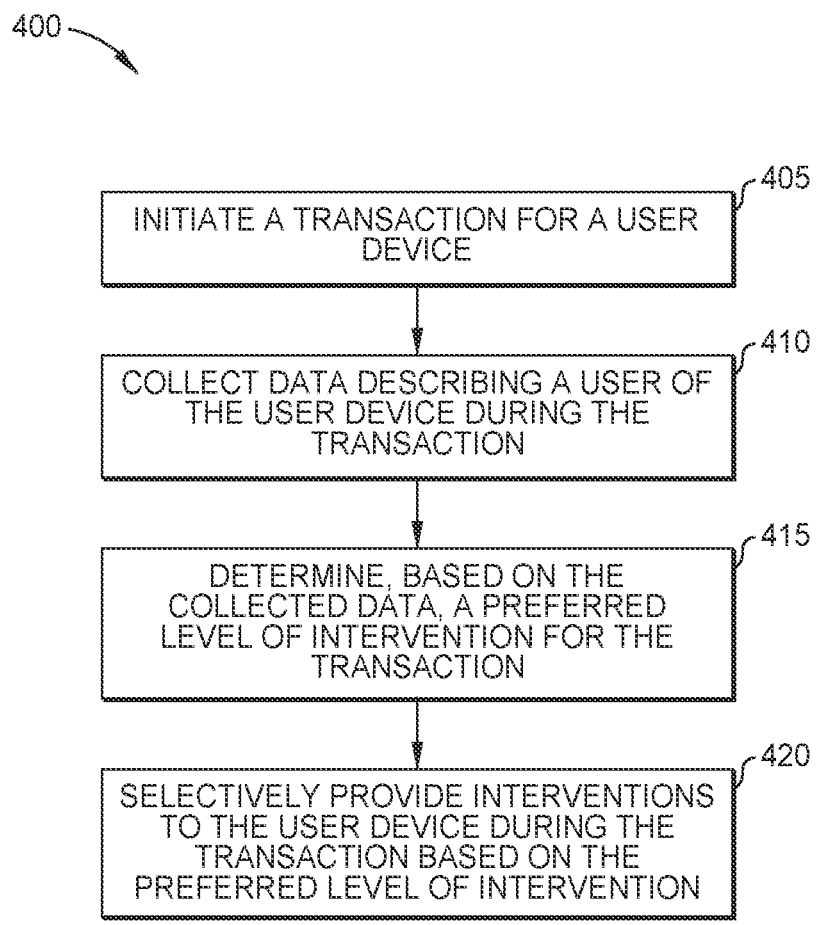
FIG. 4 is a flow diagram illustrating a method for selectively providing interventions based on transaction data, according to one embodiment disclosed herein.

FIG. 4 is a flow diagram illustrating a method 400 for selectively providing interventions based on transaction data, according to one embodiment disclosed herein. The method 400 begins at block 405, where an intervention component (e.g., the Intervention Component 110) initiates a transaction for a user device.

At block 410, the intervention component collects data describing a user of the user device during the transaction.

Further, at block 415, the intervention component determines, based on the collected data, a preferred level of intervention for the transaction.

The method 400 then continues to block 420, where the intervention component selectively provides interventions to the user device during the transaction based on the preferred level of intervention.

Figure 5:
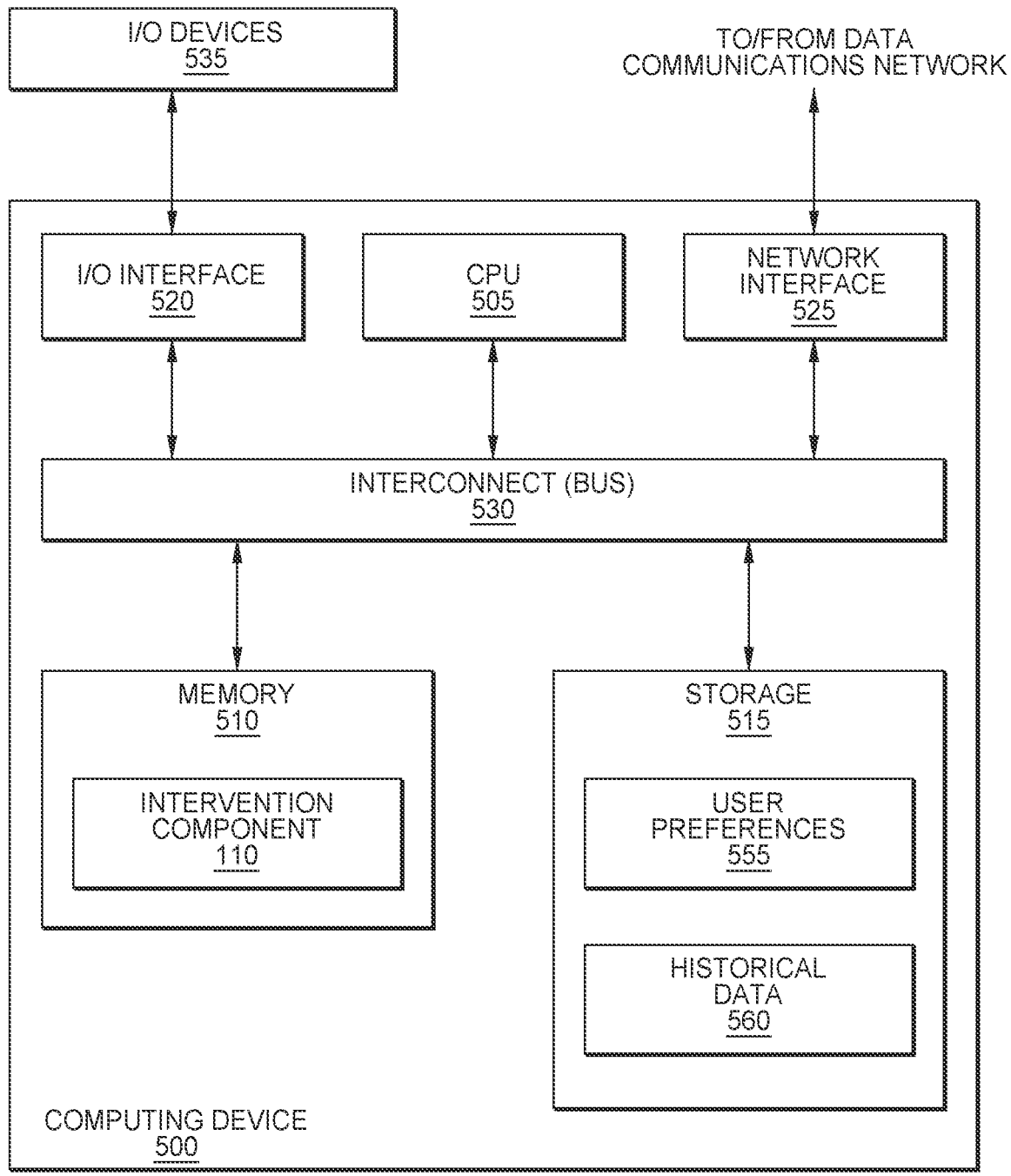
FIG. 5 is a block diagram depicting a computing device configured to automatically monitor transactions, according to one embodiment disclosed herein.

FIG. 5 is a block diagram depicting a Computing Device 500 configured to automatically monitor transactions, according to one embodiment disclosed herein. Although depicted as a physical device, in embodiments, the Computing Device 500 may be implemented using virtual device(s), and/or across a number of devices (e.g., in a cloud environment). As illustrated, the Computing Device 500 includes a CPU 505, Memory 510, Storage 515, a Network Interface 525, and one or more I/O Interfaces 520. In the illustrated embodiment, the CPU 505 retrieves and executes programming instructions stored in Memory 510, as well as stores and retrieves application data residing in Storage 515. The CPU 505 is generally representative of a single CPU and/or GPU, multiple CPUs and/or GPUs, a single CPU and/or GPU having multiple processing cores, and the like. The Memory 510 is generally included to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 535 (such as keyboards, monitors, etc.) are connected via the I/O Interface(s) 520. Further, via the Network Interface 525, the Computing Device 500 can be communicatively coupled with one or more other devices and components (e.g., via a network, which may include the Internet, local network(s), and the like). As illustrated, the CPU 505, Memory 510, Storage 515, Network Interface(s) 525, and I/O Interface(s) 520 are communicatively coupled by one or more Buses 530.

In the illustrated embodiment, the Storage 515 includes a set of one or more User Preferences 555 and Historical Data 560. Although depicted as residing in Storage 515, in embodiments, the User Preferences 555 and Historical Data 560 may reside in any suitable location. In an embodiment, each set of User Preferences 555 includes data indicating the preferences of a particular user relating to preferred interventions (e.g., relating to the type and frequency of interventions during particular times or dates, with respect to particular items, and the like).

In an embodiment, the Historical Data 560 includes historical patterns for the users (e.g., purchase history). This Historical Data 560 allows the Intervention Component 110 to refine its interventions for each user based on how the current transaction context compares to the historical data for the user.

In the illustrated embodiment, the Memory 510 includes an Audit Component 110, which may be configured to perform one or more embodiments discussed above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Intervention Component 110) or related data available in the cloud. For example, the Intervention Component 110 could execute on a computing system in the cloud. In such a case, the Intervention Component 110 could store data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   initiating a transaction for a user device;
   prior to beginning a checkout process to complete the transaction:
   determining, by an intervention component having one or more computer processors and a memory, a default level of intervention for the transaction, wherein the default level of intervention comprises at least a first default intervention;
   receiving, by the intervention component from one or more cameras arranged in a physical environment, user data during the transaction, wherein the user data comprises one or more images or videos that capture body movements associated with at least one user in the physical environment; and
   determining, by the intervention component based on the user data, a preferred level of intervention for the transaction based at least in part on the body movements of the at least one user, wherein the preferred level of intervention is different from the default level of intervention; and
   selectively providing, by the intervention component, interventions to the user device during the transaction based on the preferred level of intervention, wherein providing interventions to the user device comprises withholding the first default intervention during the transaction.

2. The method of claim 1, wherein:
   determining, by the intervention component, the preferred level of intervention comprises evaluating the one or more images or videos to identify actions taken by the at least one user.

3. The method of claim 1, wherein determining the preferred level of intervention comprises:
   determining, by the intervention component based on the user data, an urgency of a user of the user device during the transaction; and
   determining that the preferred level of intervention is low, based on the determined urgency.

4. The method of claim 3, wherein determining the urgency of the user comprises:
   determining, by the intervention component, a walking speed of the user during the transaction.

5. The method of claim 1, wherein
   selectively providing, by the intervention component, the interventions to the user device during the transaction occurs prior to beginning the checkout process to complete the transaction.

6. The method of claim 1, wherein selectively providing interventions to the user device comprises at least one of:
   providing one or more interventions in order to increase time required to complete the transaction,
   suggesting one or more alternative items,
   providing additional information on an item,
   dispatching an employee to assist the user,
   providing a survey, or
   adding one or more menu options during the transaction.

7. The method of claim 1, wherein selectively providing interventions to the user device comprises:
   providing, by the intervention component, a first interruption of a first intervention type during the transaction; and
   refraining, by the intervention component, from providing a second interruption of a second intervention type, based on determining that a user of the user device prefers the first intervention type.

8. The method of claim 1, further comprising:
   receiving, by the intervention component, additional user data from the one or more cameras arranged in the physical environment, the additional user data comprises one or more images or videos that capture additional body movements associated with the at least one user in the physical environment;
   determining, by the intervention component and based on the additional user data, an updated preferred level of intervention for the transaction, wherein the updated preferred level of intervention is lower than the preferred level of intervention; and
   refraining, by the intervention component, from providing additional interventions to the user device during the transaction based on the updated preferred level of intervention.

9. The method of claim 1, wherein selectively providing interventions comprises providing one or more interventions to affect how a user of the user device moves through the physical environment during the transaction.

10. The method of claim 1, further comprising:
    determining, by the intervention component, a number of people with a user of the user device during the transaction based at least in part on the one or more images or videos that capture the body movements associated with the at least one user in the physical environment, and wherein, in selectively providing, by the intervention component, the interventions to the user device during the transaction based on the preferred level of intervention, the interventions are provided to the user device based at least in part on the number of people with the user of the user device during the transaction.

11. The method of claim 1, further comprising:
determining, by the intervention component, that a user of the user device is suspected of stealing based at least in part on the one or more images or videos that capture the body movements associated with the at least one user in the physical environment, and
wherein, in selectively providing, by the intervention component, the interventions to the user device during the transaction based on the preferred level of intervention, the interventions are provided to the user device in an effort to slow the transaction.

12. A non-transitory computer-readable storage medium containing computer program code that, when executed by operation of one or more computer processors of an intervention component, performs an operation comprising:
initiating a transaction for a user device;
prior to beginning a checkout process to complete the transaction:
determining a default level of intervention for the transaction, wherein the default level of intervention comprises at least a first default intervention;
receiving, from one or more cameras arranged in a physical environment, user data during the transaction, wherein the user data comprises one or more images or videos that capture body movements associated with at least one user in the physical environment; and
determining, based on the user data, a preferred level of intervention for the transaction based at least in part on the body movements of the at least one user, wherein the preferred level of intervention is different from the default level of intervention; and
selectively providing interventions to the user device during the transaction based on the preferred level of intervention, wherein providing interventions to the user device comprises withholding the first default intervention during the transaction.

13. The non-transitory computer-readable storage medium of claim 12, wherein:
determining the preferred level of intervention comprises evaluating the one or more images or videos to identify actions taken by the at least one user.

14. The non-transitory computer-readable storage medium of claim 12, wherein determining the preferred level of intervention comprises:
determining, based on the user data, an urgency of a user of the user device during the transaction; and
determining that the preferred level of intervention is low, based on the determined urgency.

15. The non-transitory computer-readable storage medium of claim 14, wherein determining the urgency of the user comprises:
determining a walking speed of the user during the transaction.

16. The non-transitory computer-readable storage medium of claim 12, wherein selectively providing interventions to the user device comprises:
providing a first interruption of a first intervention type during the transaction; and
refraining from providing a second interruption of a second intervention type, based on determining that a user of the user device prefers the first intervention type.

17. The non-transitory computer-readable storage medium of claim 12, the operation further comprising:
receiving additional user data from the one or more cameras arranged in the physical environment, the additional user data comprises one or more images or videos that capture additional body movements associated with the at least one user in the physical environment;
determining, based on the additional user data, an updated preferred level of intervention for the transaction, wherein the updated preferred level of intervention is lower than the preferred level of intervention; and
refraining from providing additional interventions to the user device during the transaction based on the updated preferred level of intervention.

18. An intervention component, comprising:
one or more computer processors; and
a memory containing a program which when executed by the one or more computer processors performs an operation, the operation comprising:
initiating a transaction for a user device;
prior to beginning a checkout process to complete the transaction:
determining a default level of intervention for the transaction, wherein the default level of intervention comprises at least a first default intervention;
receiving, from one or more cameras arranged in a physical environment, user data during the transaction, wherein the user data comprises one or more images or videos that capture body movements associated with at least one user in the physical environment; and
determining, based on the user data, a preferred level of intervention for the transaction based at least in part on the body movements of the at least one user, wherein the preferred level of intervention is different from the default level of intervention; and
selectively providing interventions to the user device during the transaction based on the preferred level of intervention, wherein providing interventions to the user device comprises withholding the first default intervention during the transaction.

19. The intervention component of claim 18, wherein:
determining the preferred level of intervention comprises evaluating the one or more images or videos to identify actions taken by a user of the user device.

20. The intervention component of claim 18, wherein determining the preferred level of intervention comprises:
determining, based on the user data, an urgency of a user of the user device during the transaction; and
determining that the preferred level of intervention is low, based on the determined urgency.

* * * * *